US008421759B2

(12) United States Patent
Chien et al.

(10) Patent No.: US 8,421,759 B2
(45) Date of Patent: Apr. 16, 2013

(54) TOUCH-SENSING SUBSTRATE, COLOR FILTER SUBSTRATE AND TOUCH-SENSING LIQUID CRYSTAL DISPLAY

(75) Inventors: Yu-Feng Chien, Taipei County (TW); Tun-Chun Yang, Taipei (TW); Seok-Lyul Lee, Hsinchu (TW); Wei-Ming Huang, Taipei (TW); Yuan-Chun Wu, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 559 days.

(21) Appl. No.: 12/409,521

(22) Filed: Mar. 24, 2009

(65) Prior Publication Data

US 2010/0110023 A1 May 6, 2010

(30) Foreign Application Priority Data

Nov. 5, 2008 (TW) ................................ 97142742 A

(51) Int. Cl.
*G06F 3/041* (2006.01)
(52) U.S. Cl.
USPC .................. 345/173; 349/106; 178/18.06
(58) Field of Classification Search .................. None
See application file for complete search history.

(56) References Cited

U.S. PATENT DOCUMENTS 5,963,277 A * 10/1999 Kim et al. ...................... 349/12
7,180,505 B2   2/2007 Oh et al.
2005/0243023 A1* 11/2005 Reddy et al. .................. 345/48
2008/0007534 A1   1/2008 Peng et al.
2008/0122800 A1*  5/2008 Meng ............................. 345/173
2009/0096767 A1*  4/2009 Liu et al. ....................... 345/175
2009/0184937 A1*  7/2009 Grivna ........................... 345/173
2009/0309850 A1* 12/2009 Yang ............................. 345/174
2010/0039407 A1*  2/2010 Chuang ......................... 345/174

FOREIGN PATENT DOCUMENTS

| CN | 2553430 Y | 5/2003 |
| CN | 101131492 | 2/2008 |
| CN | 101149502 | 3/2008 |
| WO | 2007/008518 | 1/2007 |

* cited by examiner

*Primary Examiner* — Jason Olson
(74) *Attorney, Agent, or Firm* — Jianq Chyun IP Office

(57) ABSTRACT

A color filter substrate including a substrate, a plurality of patterned color filter layers, and a plurality of sensing serials is provided. The substrate has a first surface and a second surface opposite to the first surface. The substrate includes a plurality of display regions arranged in array and a separated region located between the display regions. The patterned color filter layers are arranged in array on the first surface and corresponding to the display regions. The sensing serials are arranged on the second surface and insulated from each other. Each sensing serial includes a plurality of sensing pads; a plurality of bridging lines, each connected with two adjacent sensing pads; a plurality of patterned conductive layers stacked and electrically connected with the sensing pads. The position of the patterned conductive layers is corresponding to the separated region. A touch-sensing liquid crystal display and a touch-sensing substrate are also provided.

28 Claims, 8 Drawing Sheets

TOUCH-SENSING SUBSTRATE, COLOR FILTER SUBSTRATE AND TOUCH-SENSING LIQUID CRYSTAL DISPLAY

CROSS-REFERENCE TO RELATED APPLICATION

This application claims the priority benefit of Taiwan application serial no. 97142742, filed Nov. 5, 2008. The entirety of the above-mentioned patent application is hereby incorporated by reference herein and made a part of specification.

BACKGROUND OF THE INVENTION

1. Field of the Invention

The present invention relates to a touch-sensing substrate, and more particularly, to a touch-sensing substrate which may be integrated into a color filter substrate or a touch sensing liquid crystal display.

2. Description of Related Art

With the rapid development and application of information technology, wireless mobile communication, and informational household appliances, a good number of informational products are now using a touch panel as an input device instead of a conventional input device such as a keyboard or a mouse, wherein a touch-sensing display has become one of the most popular products on the current market.

Current touch panels mainly include capacitive, resistive, photosensitive touch panels with capacitive touch panels being the main stream product. Categorizing in terms of structure, touch panels may be divided into two major types, an attachment type and an integration type. Manufacture of the integrated touch panel can be combined with the fabrication process of the whole panel (e.g. the fabrication process of a color filter) and thus may help reduce overall thickness of the product to meet the trend of thin and light weight products.

In detail, an integrated capacitive touch panel structurally includes a single side design of integrating a color filter layer and a touch-sensing unit on one surface of a glass substrate as well as a dual side design of respectively fabricating the color filter layer and the touch-sensing unit on two opposite surfaces of the glass substrate. The dual side design is easier in fabrication but has limitation in terms of thickness and resolution. The single side design provides simpler structure than the dual side design but also has the problems of complicated fabrication and low resolution.

In general, in a touch panel of the dual side design, a capacitive sensing layer includes a transparent conductive layer of Indium Tin Oxides (ITO) and layers of insulating material, for example. However, thickness of the capacitive sensing layer easily affects overall transmittance of the color filer substrate. Therefore, to increase the transmittance of the touch panel in the above-mentioned dual side design, the thickness of the conductive film layer (e.g. the above-mentioned ITO) comprising the capacitance sensing layer usually has to be reduced. The aforesaid method, however, increases the sheet resistance of the conductive film layer in the capacitive sensing layer and thereby reduces the strength of sensing signals. Furthermore, the touch panel of the single side design in the conventional technology also encounters the same problem.

In other words, one issue to be resolved in the manufacturing technology of touch panels lies in how to appropriately reduce the thickness of the conductive layer without significantly increasing the sheet resistance so as to promote touch-sensing characteristics and transmittance of the touch panels.

SUMMARY OF THE INVENTION

The present invention provides a color filter substrate which uses a plurality of patterned conductive layers to improve the increased sheet resistance due to reduction in thickness of a transparent conductive layer and thereby provides better transmittance.

The present invention also provides a touch-sensing liquid crystal display including the aforesaid color filter substrate and thus is capable of providing better display quality.

The present invention further provides a touch-sensing substrate which uses a plurality of patterned conductive layers to improve the increased sheet resistance due to reduction in thickness of a transparent conductive layer and thereby provides better transmittance.

The present invention provides a color filter substrate including a substrate, a plurality of patterned color filter layers, and a plurality of sensing serials. The substrate has a first surface and a second surface opposite to the first surface. The substrate includes a plurality of display regions arranged in array and a separated region located between the display regions. The patterned color filter layers are arranged in array on the first surface and corresponding to the display regions. The sensing serials are arranged on the second surface. The sensing serials are insulated from each other and each of the sensing serials includes a plurality of sensing pads, a plurality of bridging lines, and a plurality of patterned conductive layers. Each bridging line is connected with two adjacent sensing pads. The patterned conductive layers are stacked with the sensing pads and are electrically connected to the sensing pads. The positions of the patterned conductive layers are corresponding to the separated region between the display regions.

The present invention further provides a touch-sensing liquid crystal display including a color filter substrate, a transistor array substrate, and a liquid crystal layer. The color filter substrate includes a substrate, a plurality of patterned color filter layer, and a plurality of sensing serials. The substrate has a first surface and a second surface opposite to the first surface. The substrate includes a plurality of display regions arranged in array and a separated region located between the display regions. The patterned color filter layers are arranged in array on the first surface of the substrate and corresponding to the display regions. The sensing serials are arranged on the second surface. The sensing serials are insulated from each other and each of the sensing serials includes a plurality of sensing pads, a plurality of bridging lines, and a plurality of patterned conductive layers. Each bridging line is connected with two adjacent sensing pads. The patterned conductive layers are stacked with the sensing pads and are electrically connected to the sensing pads. The positions of the patterned conductive layers are corresponding to the separated region between the display regions. The transistor array substrate is disposed opposite to the first surface of the color filter substrate. The liquid crystal layer is disposed between the color filter substrate and the transistor array substrate.

The present invention further provides a touch-sensing substrate including a substrate and a plurality of sensing serials. The substrate has a plurality of display regions arranged in array and a separated region located between the display regions. The plurality of sensing serials is arranged on the substrate. The sensing serials are insulated from each other and each of the sensing serials includes a plurality of sensing pads, a plurality of bridging lines, and a plurality of patterned conductive layers. Each bridging line is connected with two adjacent sensing pads. The patterned conductive layers are stacked with the sensing pads and are electrically connected to the sensing pads. The positions of the patterned conductive layers are corresponding to the separated region between the display regions.

In one embodiment of the present invention, the sensing serial includes a plurality of first sensing serials and a plurality of second sensing serials. The first sensing serials extend along a first direction and the second sensing serials extend along a second direction, wherein the first direction and the second direction are substantially perpendicular.

In one embodiment of the present invention, the material of the sensing pads includes transparent conductive material.

In one embodiment of the present invention, the material of the bridging lines is the same as the material of the patterned conductive layers.

In one embodiment of the present invention, the sheet resistance of the bridging lines is lower than the sheet resistance of the sensing pads.

In one embodiment of the present invention, the sheet resistance of the patterned conductive layers is lower than the sheet resistance of the sensing pads.

In one embodiment of the present invention, the material of the bridging lines and the patterned conductive layers includes metal.

In one embodiment of the present invention, the material of the bridging lines and the patterned conductive layers includes composited metal layers such as titanium/aluminum/titanium.

In one embodiment of the present invention, the patterned conductive layers are disposed between the substrate and the sensing pads.

In one embodiment of the present invention, the sensing pads are disposed between the substrate and the patterned conductive layers.

In one embodiment of the present invention, the color filter substrate further includes a black matrix layer. The black matrix layer is disposed on the first surface and between the patterned color filter layers.

In one embodiment of the present invention, each patterned conductive layer is a strip patterned conductive layer.

In one embodiment of the present invention, each patterned conductive layer is a mesh patterned conductive layer.

In one embodiment of the present invention, the area of each sensing pad is greater than the area of each patterned color filter layer.

In summary, the touch-sensing color filter substrate of the present invention not only reduce the high sheet resistance but also provides better transmittance by disposing the patterned conductive layers in the separated region between the display regions.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

Figure 1A:
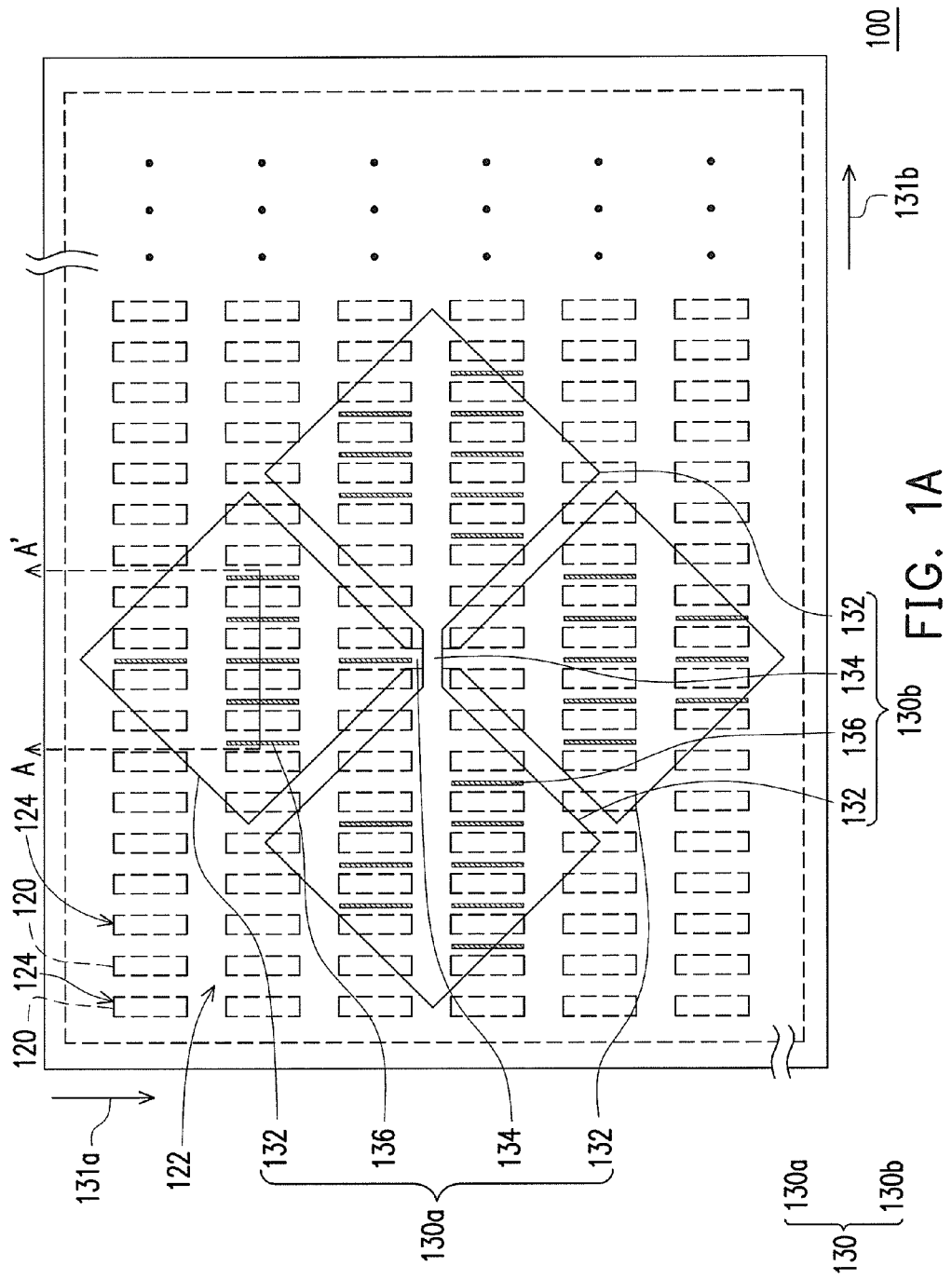
FIG. 1A is a partial top view of a color filter substrate according to one embodiment of the present invention.
Figure 1B:
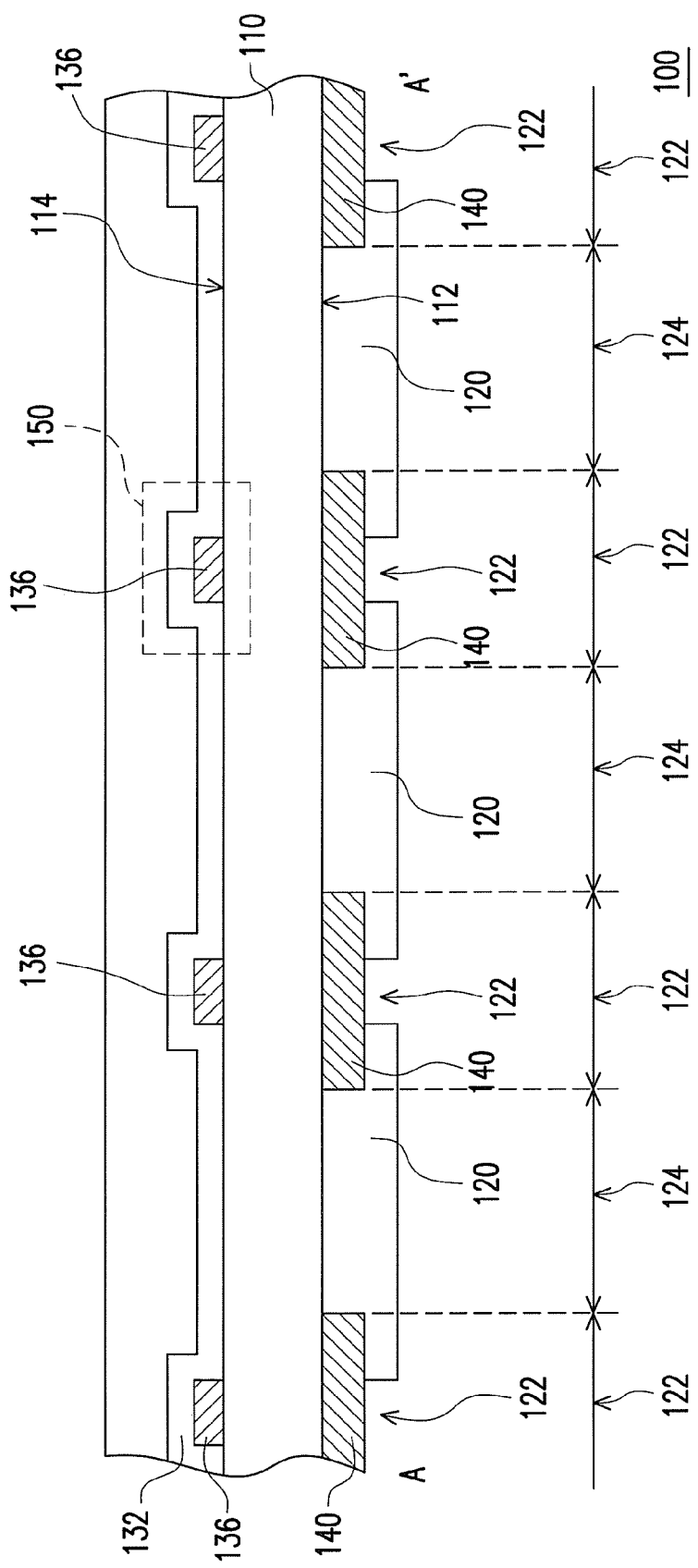
FIG. 1B is a cross-sectional view of the color filter substrate in FIG. 1A taken along a line AA'.

FIG. 1A is a partial top view of a color filter substrate according to one embodiment of the present invention. FIG. 1B is a cross-sectional view of the color filter substrate in FIG. 1A taken along a line AA'. A region in FIG. 1A depicted with dotted lines is a perspective view of a first surface of the color filter substrate. For simplicity of illustration, FIG. 1A mainly shows schematic views of display regions, patterned color filter layers, a separated region, and sensing serials, omitting other possible layers. From a comparison of FIG. 1A and FIG. 1B, the color filter substrate 100 is a touch-sensing color filter substrate of a dual side design. A detailed illustration on the structure of the color filter substrate 100 is given below Referring to FIG. 1A and FIG. 1B, the color filter substrate 100 of the present embodiment includes a substrate 110, a plurality of patterned color filter layers 120 and a plurality of sensing serials 130. In the present embodiment, the substrate 110 has a first surface 112 and a second surface 114 opposite to the first surface 112. The substrate 110 further has a plurality of display regions 124 arranged in array. A separated region 122 (alternatively referred to as a display separated region) is located between the display regions 124, as shown in FIG. 1A. In the present embodiment, the material of the substrate 110 may be inorganic transparent material (e.g. glass, quartz, or other suitable material) or organic transparent material (e.g. polyalkene, polythiourea, polyalcohol, polyester, rubber, thermoplastic polymer, thermosetting polymer, polyarylene, polymethylmethacrylate, polycarbonate, or other suitable material). In the present embodiment, the substrate 110 is used as a base in the color filer substrate 100. The inorganic transparent material, glass, is used as an example, which is not limited by the present invention herein.

In addition, the patterned color filter layers 120 (alternatively referred to as color filter layer regions) are arranged on the first surface 112 of the substrate 110 and are corresponding to the display regions 124, as shown in FIG. 1A and FIG. 1B. In general, to prevent light passing through the patterned color filter layer 120 from leakage in the separated region 122, a light-shielding layer is usually disposed on the separated region 122 to increase contrast ratio with the color filter substrate 100 during displaying. Therefore, in the present embodiment, the color filter substrate 100 may further include a black matrix layer 140 disposed on the first surface 112 of the substrate 110 and located on the separated region 122, as shown in FIG. 1B. In another embodiment, the patterned color filter layer 120 may also extend over the black matrix layer 140 on the separated regions 122. In other words, a plurality of patterned color filter layers 120 may be arranged in array on the display regions 124 of the first surface 112 of the substrate 110 of the color filter substrate 100. Furthermore, the patterned color filter layers 120 extend onto the separated region 122 and stack over the black matrix layer 140, as shown in FIG. 1B. In an alternative embodiment, no black matrix layer is required in the separated region 122 and the black matrix layer is replaced with a stack of red, green, and blue patterned color filter layers 120. As such, only the patterned color filter layers 120 are formed on the first surface 112.

As shown in FIG. 1B, the black matrix layer 140 partially overlaps with two adjacent patterned color filter layers 120. During fabrication, the black matrix layer 140 is formed on the first surface 112 of the substrate 110 first. Then, the patterned color filter layers 120 are formed on the first surface 112 of the substrate 110. However, in another embodiment, according to fabrication concerns or design requirements, the patterned color filter layers 120 may be formed on the substrate 110 first and then the black matrix layer 140 is formed on the substrate 110 to cover part of the patterned color filter layers 120 so that the color filter substrate 100 can provide good display contrast ratio. Therefore, the relationship between the above-mentioned patterned color filter layer 120 and the black matrix layer 140 is merely illustrated as an example and is not limited herein.

Furthermore, the sensing serials 130 are arranged on the second surface 114 of the substrate 110, as shown in FIG. 1A and FIG. 1B. The sensing serials 130 are insulated from each other and each of the sensing serials 130 includes a plurality of sensing pads 132, a plurality of bridging lines 134, and a plurality of patterned conductive layers 136. Each bridging line 134 is connected with two adjacent sensing pads 132. The patterned conductive layers 136 overlap with the sensing pads 132 (e.g. the patterned conductive layer 136s are disposed above or below the sensing pads 132) and are electrically connected to the sensing pads 132. The positions of the patterned conductive layers 136 are corresponding to the separated region 122 between the display regions 124, as shown in FIG. 1A and FIG. 1B.

For example, the sensing serial 130 of the present embodiment includes a plurality of first sensing serials 130a and a plurality of second sensing serials 130b. The first sensing serials 130a and the second sensing serials 130b are insulated from each other. The first sensing serials 130a extend along a first direction 131a. The second sensing serials 130b extend along a second direction 131b. In the present embodiment, the first direction 131a and the second direction 131b are substantially perpendicular. In other embodiments, the first and second directions may have other orientations according to different designs of the first sensing serials 130a and the second sensing serials 130b. The above description is given for the purpose of illustration and is not intended to limit the scope of the present invention.

In addition, the material of the sensing pads 132 may include transparent conductive material of single or multiple layers. The material of the sensing pads 132 is, for example, indium tin oxide (ITO), indium zinc oxide (IZO), or other suitable material. The present embodiment uses ITO as the material of the sensing pads 132 as an example, which is not to be limited herein, however.

In the present embodiment, the material of the bridging lines 134 and the patterned conductive layers 136 may be the same and may be metal of single or multiple layers. The material of the bridging lines 134 and the patterned conductive layers 136 is, for example, silver, copper, tin, lead, hafnium, tungsten, molybdenum, neodymium, titanium, tantalum, aluminum, zinc, or other suitable material. The present embodiment uses titanium/aluminum/titanium as the material of the bridging lines 134 and the patterned conductive layers 136 as an example, which is not to be limited herein, however. Transparent conductive material of single or multiple layers may also be used for the bridging line 134 because the bridging line 134 is short. Alternative material of the bridging line 134 is, for example, indium tin oxide (ITO), indium zinc oxide (IZO), or other suitable material. In addition, multi-layered structure of metal and transparent conductive material may also be used in place thereof.

Figure 1C:
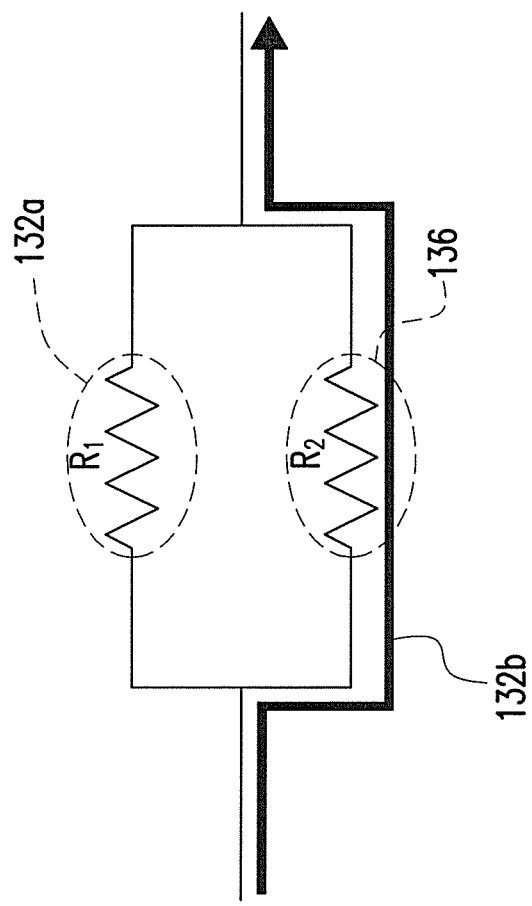
FIG. 1C is an equivalent circuit diagram illustrating a partial region 150 in FIG. 1B.

FIG. 1C is an equivalent circuit diagram illustrating a partial region 150 in FIG. 1B. A resistor R1 including the sensing pad 132 and a resistor R2 including the patterned conductive layer 136 are equivalent circuits connected in parallel. Referring to both FIG. 1B and FIG. 1C, in the present embodiment, reducing thickness of the sensing pad 132 may enable the color filter substrate 100 to provide better transmittance. However, the overall resistance of the sensing serial 130 is increased when thickness of the sensing pad 132 is reduced. Therefore, on the color filter substrate 100, the patterned conductive layers 136 are disposed between the substrate 110 and the sensing pads 132. Additionally, the patterned conductive layers 136 are disposed on the separated region 122 between the display regions 124 and are stacked with the sensing pads 132, as shown in FIG. 1B and FIG. 1C, so as to reduce the overall resistance of the sensing serial 130.

In the present embodiment, the sheet resistance of the patterned conductive layers 136 is lower than the sheet resistance of the sensing pads 132. For example, when the patterned conductive layers are of titanium/aluminum/titanium and the sensing pads 132 are of ITO with thickness between 500 Å~3000Å or less than 500Å, for example. In the present embodiment, the sheet resistance of the patterned conductive layer 136 and the sheet resistance of the sensing pad 132 have a ratio between 1:10~1:2000. Thus, equivalent sheet resistance of the sensing pad 132 and the patterned conductive layer 136 can be less than the sheet resistance of a single sensing pad 132. As such, when the user touches the color filter substrate 100, coupled electrical current 132b generated when the sensing pads 132 are driven is conducted through the patterned conductive layer 136, as shown in FIG. 1C and thus the overall resistance of the sensing serials 130 is reduced due to increase in thickness of the sensing pads 132.

Moreover, the sheet resistance of the bridging lines 134 can also be lower than the sheet resistance of the sensing pads 132 because the bridging lines 134 and the patterned conductive layers 136 use the same material which is metal of single or multiple layers, for example. As a result, the overall resistance of the sensing serials 130 that is increased due to the reduction in the thickness of the sensing pad 132 may be partially decreased.

It should be noted that the sensing pads 132 may be disposed between the substrate 110 and the patterned conductive layers 136 in another embodiment (not shown). In other words, in addition to below the sensing pads 132, the patterned conductive layers 136 may also be disposed above the sensing pads 132 to achieve the same effects as the afore described.

Furthermore, in the present embodiment, each patterned conductive layer 136 is a strip patterned conductive layer, as shown in FIG. 1A. In other embodiments (not shown), a shape of the patterned conductive layer 136 may be circular or other geometric shapes according to design requirements.

In addition, the patterned conductive layers 136 are disposed on the second surface 114 and occupy the separated region at a percentage between 1% and 99%. Preferably, the width of the patterned conductive layers 136 is half of width of the black matrix layer 140. For example, when the width of the black matrix layer is about 30 μm, the width of the patterned conductive layers 136 is preferably about 15 μm. Moreover, when the black matrix layer 140 is not disposed on the color filter substrate 100, the patterned conductive layers 136 disposed on the second surface 114 of the separated region 122 may be used for light shielding. In this case, the area of the patterned conductive layers 136 disposed on the separated region 122 may be determined by the above-mentioned ratio or other design requirements. Preferably, the above-mentioned arrangement is capable of preventing light leakage and promoting display quality.

It should be noted that the aforesaid patterned conductive layers 136 are all disposed above or below the sensing pad. In one embodiment, the patterned conductive layers 136 may further be disposed on the separated region of the first surface to shield light.

In addition to improving the problem of high resistance resulted from the increase in the transmittance of the color filter substrate 100, the patterned conductive layers 136 may act as similar function of a black matrix layer for light shielding to promote contrast ratio.

Disposition of the patterned conductive layers 136 on the second surface 114 of the substrate 100 may be implemented in various methods, of which two embodiments are illustrated below.

Figure 2A:
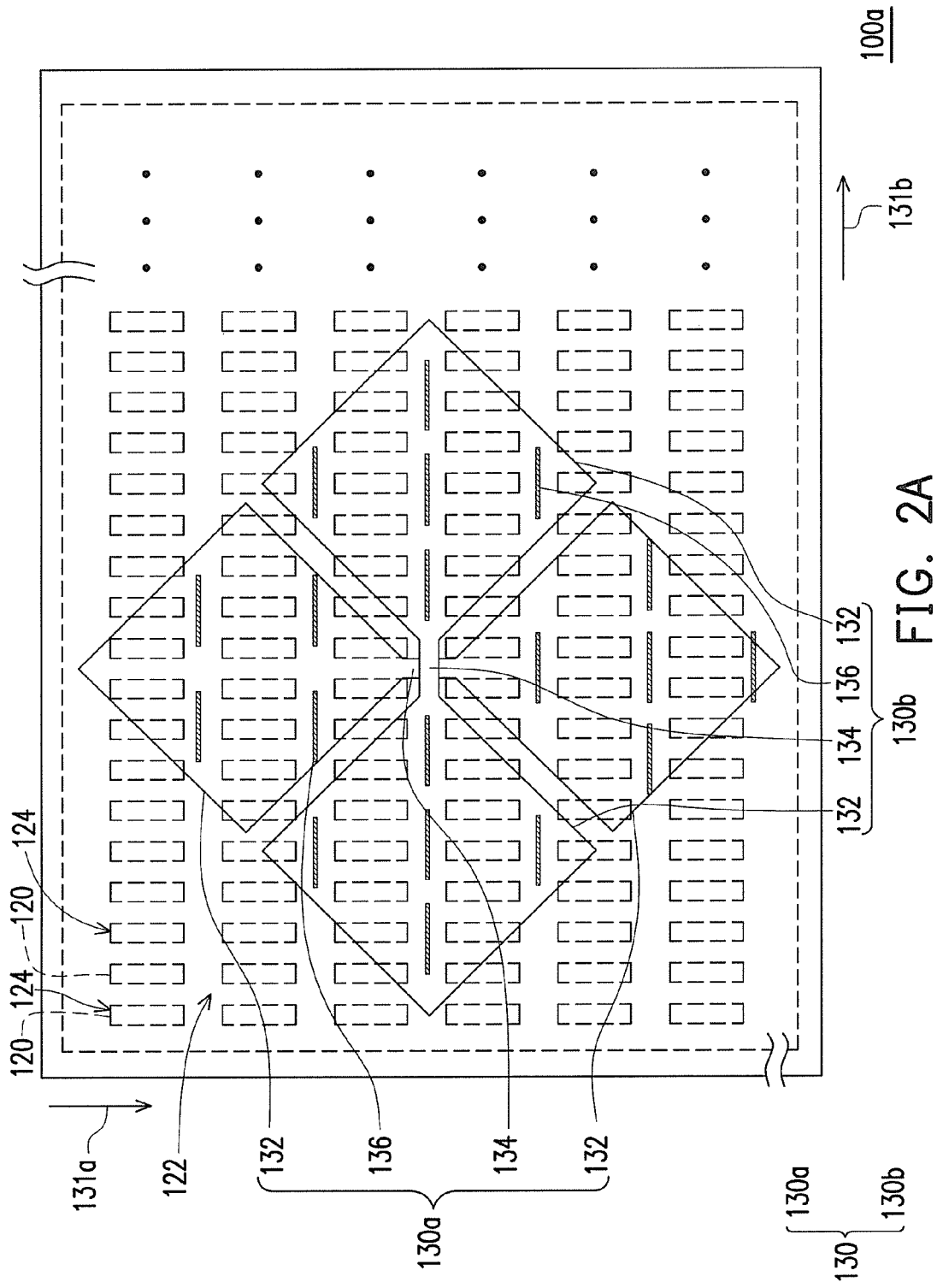
FIG. 2A-FIG. 2B are partial top views of a color filter substrate according to different embodiments of the present invention.
Figure 2B:
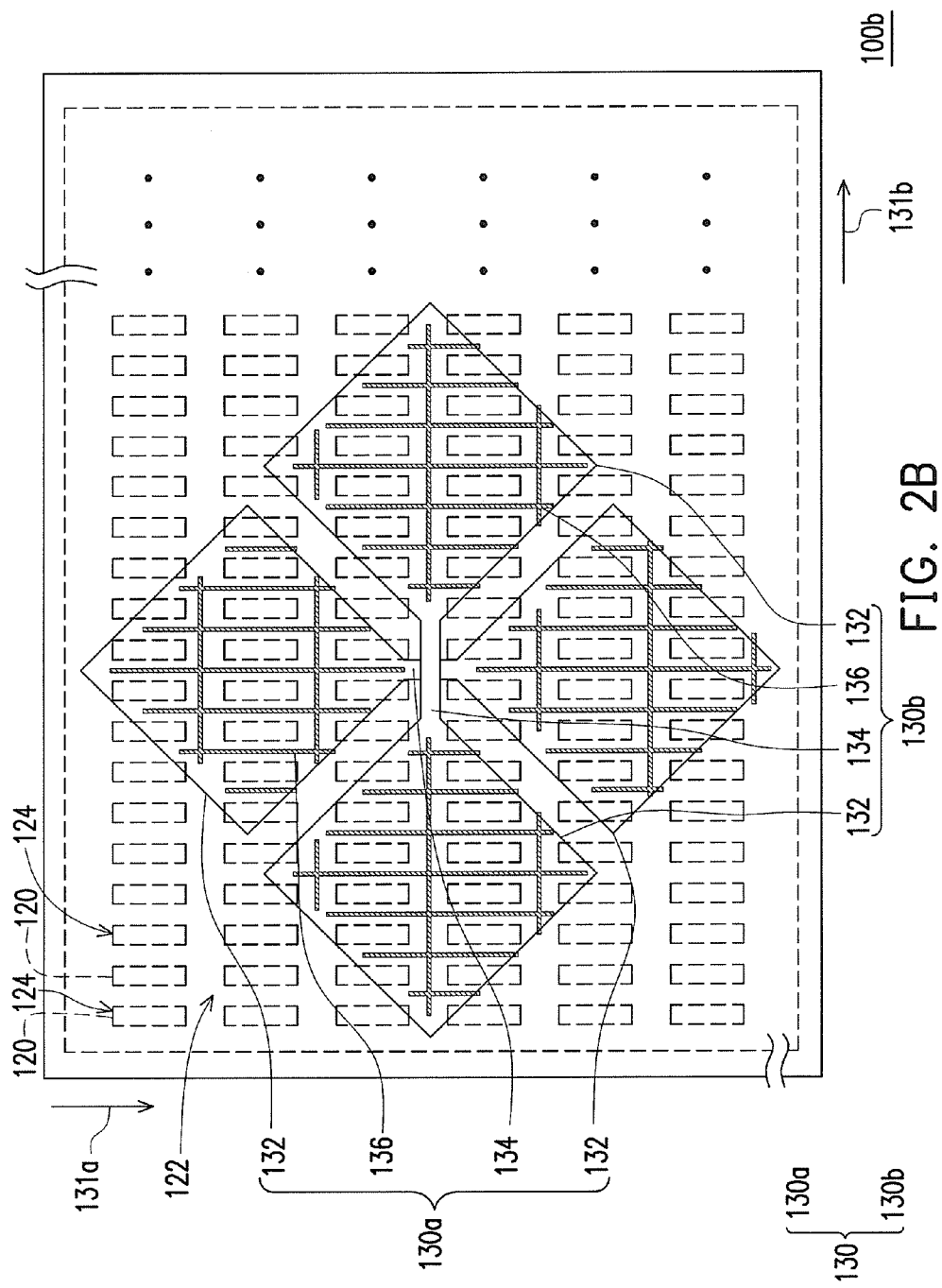

FIG. 2A-FIG. 2B are partial top views of a color filter substrate according to different embodiments of the present invention. First referring to FIG. 1A and FIG. 2A, a color filter substrate 100a and the color filter substrate 100 have similar structures, wherein like components are denoted by like numerals. The difference thereof lies in that the patterned conductive layers 136 of the color filter substrate 100a is disposed on a second surface 114 in a second direction 131b while the patterned conductive layers 136 of the color filter substrate 100 is disposed in the first direction 131a.

The patterned conductive layers 136 of the color filter substrates 100 and 100a in FIG. 1A and FIG. 2A are strip patterned conductive layers and each patterned conductive layer 136 is not electrically connected. However, in another embodiment, adjacent patterned conductive layers 136 may also be connected into a long strip patterned conductive layer. Similarly, the color filter substrate 100a also has the same advantages and applications as the above-mentioned color filter substrate 100, which shall not be described herein.

Referring to FIG. 1A, FIG. 2A, and FIG. 2B, a structure of the color filter substrate 100b is similar to the structures of the color filter substrates 100 and 100a, wherein like components are denoted by like numerals. Difference between the color filter substrate 100b and the color filter substrates 100 and 100a lies in that disposition of the patterned conductive layers 136. Specifically, the patterned conductive layers 136 are disposed on the color filter substrate 100b as mesh patterned conductive layers, as shown in FIG. 2B. Similarly, the color filter substrate 100b also has the same features and applications as the above-mentioned color filter substrates 100 and 100a, which shall not be described herein.

Figure 3:
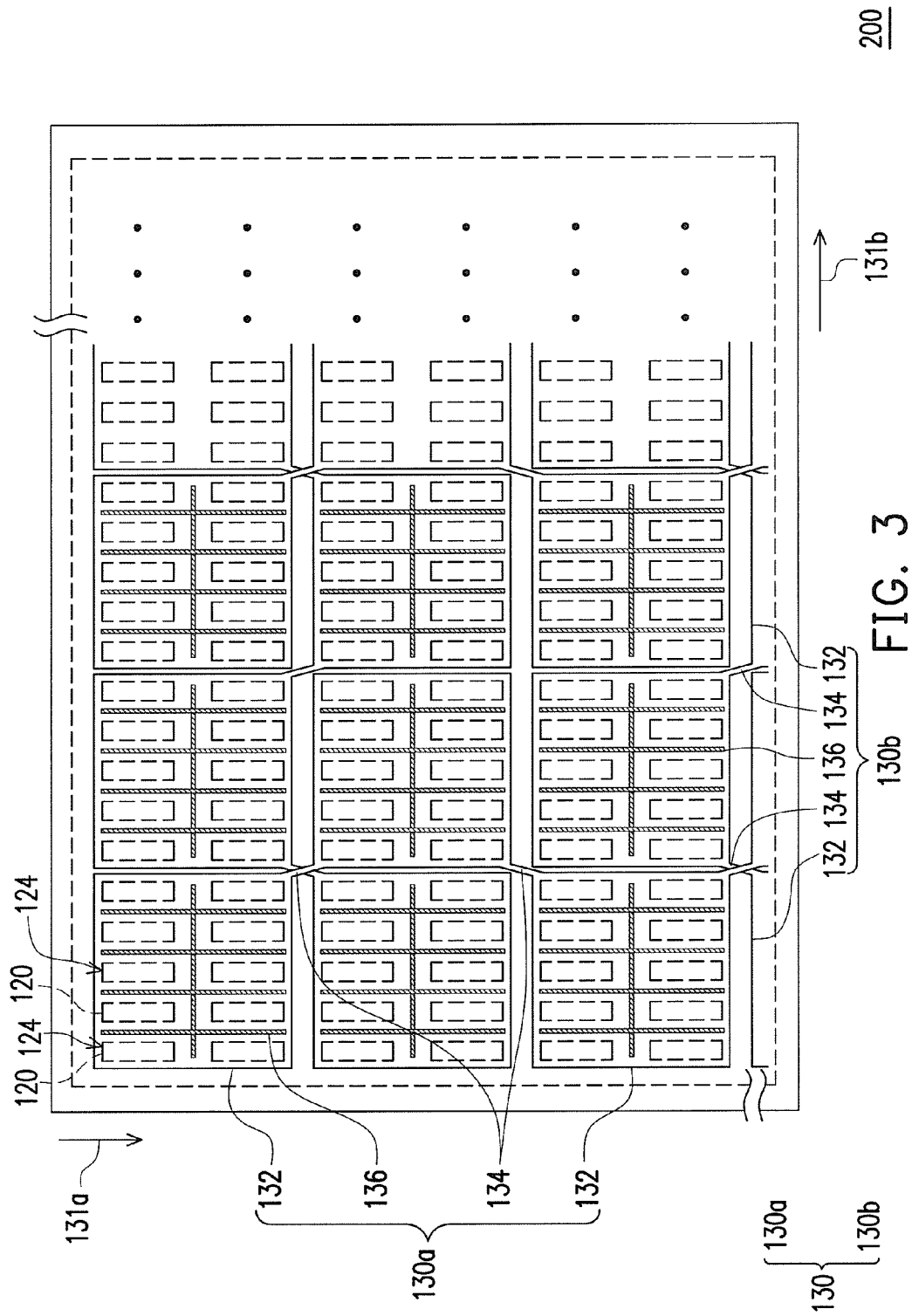
FIG. 3 is a partial top view of a color filter substrate according to another embodiment of the present invention.

FIG. 3 is a partial top view of a color filter substrate according to another embodiment of the present invention. Referring to FIG. 1A and FIG. 3, a color filter substrate 200 and the color filter substrate 100 have similar structures, wherein like components are denoted by like numerals. The difference lies in the following. The first sensing serials 130a and the second sensing serials 130b are similarly arranged along a first direction 131a and a second direction 131b. However, comparing FIG. 1A and FIG. 3, the first sensing serials 130a and the second sensing serials 130b are arranged extending respectively along a first direction and a second direction in a zigzag and regular manner. In addition, each of the sensing pads 132 disposed on the color filter substrate 200 may neatly align with a group of display regions 124, as shown in FIG. 3. As such, not only is the arrangement of the sensing pads 132 simplified, the resolution of the sensing serials 130a and 130b on the color filter substrate 200 may be determined by the number of the display regions 124 in each group.

For example, a 2×5 display region 124 is defined as a group in the present embodiment. However, other less or more display regions 124, such as a 1×1 display region 124 of the color filter substrate 200, may also be defined as a group according to design requirement. In other words, each of the sensing pads 132 is corresponding to one sensing region, respectively. The resolution of the sensing serials 130a and 130b on the color filter substrate 200 is significantly increased, as a result. The above descriptions are merely for the purpose of illustration. The number of display regions 124 of each group may depend upon design requirements, which is not to be limited herein.

Similarly, the transmittance of the color filter substrate 200 is increased by reducing thickness of the sensing pads 132, which still causes the problem of increased sheet resistance of the sensing pads 132. Therefore, as described in the previous embodiment, the patterned conductive layers 136 may be disposed above/below the sensing pads 132 to further improve the increased equivalent sheet resistance issue resulted from reduction in the thickness of the sensing pads 132. The detailed principles have been illustrated in the above sections and will not be further described herein.

It should be noted that the arrangement of the patterned conductive layers as shown in FIG. 3 is merely an example and may also be the same as the arrangements illustrated in FIG. 1A, FIG. 2A, FIG. 2B, or a combination thereof or the arrangement of the above embodiment.

Figure 4:
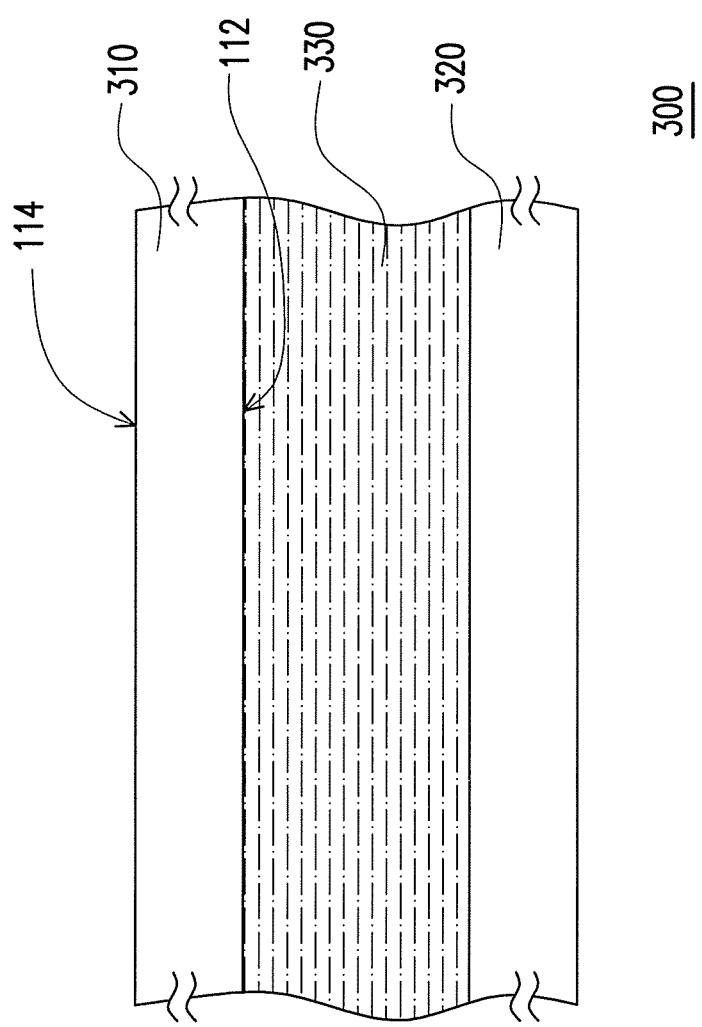
FIG. 4 is a schematic view of a touch-sensing liquid crystal display according to an embodiment of the present invention.

Furthermore, FIG. 4 is a schematic view of a touch-sensing liquid crystal display according to an embodiment of the present invention. A touch-sensing liquid crystal display 300 includes a color filter substrate 310, a transistor array substrate 320, and a liquid crystal layer 330. The color filter substrate 310 uses, for example, one of the above-mentioned color filter substrates 100, 100a, 100b, and 200, wherein like components are denoted by like numerals. The transistor array substrate 320 is disposed opposite to a first surface 112 of the color filter substrate 310, as shown in FIG. 4 and FIG. 1B. The liquid crystal layer 330 is disposed between the color filter substrate 310 and the transistor array substrate 320.

In general, the transistor array substrate 320 may be classified into a top-gate and a bottom-gate design or may be divided into P-MOS transistor (P-channel MOSFET) and N-MOS transistor. Furthermore, storage capacitors on the transistor array substrate 320 may even be classified into a metal-insulator-metal (MIM) design or a metal-insulator-transparent electrode layer (e.g. ITO) design. Meanwhile, the transistor array substrate 320 may also be classified into reflective type, transmissive type, transflective type, or a micro-reflective type according to pixel structures on the transistor array substrate 320. In other words, the transistor array substrate 320 may be a transistor array substrate formed with the aforesaid elements and application thereof according to design requirement.

In addition, according to type or arrangement of liquid crystal molecules, the material of the liquid crystal layer 330 may be nematic liquid crystal, cholesteric liquid crystal, smectic liquid crystal, discotic liquid crystal, and bowlic liquid crystal. Moreover, methods of filling the liquid crystal layer 330 between the color filter substrate 310 and the transistor array substrate 320 may include one drop filling process (ODF process), a vacuum suction process, etc. The aforesaid methods of filling and the material of the liquid crystal molecules may certainly depend upon design requirement. The above-mentioned is given as an example and is not intended to limit the scope of the present invention.

Since the color filter substrate 310 of the touch-sensing liquid crystal display adopts the above-mentioned color filter substrates 100, 100a, 100b, and 200, when the touch-sensing liquid crystal display 300 is driven, display quality of the image displayed thereon is superior. Furthermore, the touch-sensing liquid crystal display 300 may have simple touch-sensing design according to design of arrangement of the patterned conductive layers 136 disposed on the color filter substrate 310 and may provide better touch control sensitivity or resolution.

The Second Embodiment

A touch-sensing substrate of the present embodiment adopts the design concept similar to the above-mentioned color filter substrates except that the touch-sensing substrate is an opposite substrate (opposite to the transistor array substrate) and provides touch-sensing functionality. In other words, only the sensing serials are arranged on the opposite substrate, the above-mentioned patterned color filter layers are correspondingly disposed on the display regions of the transistor array substrate. The relationship of each of the components of the touch-sensing substrate is detailed in the following.

Figure 5:
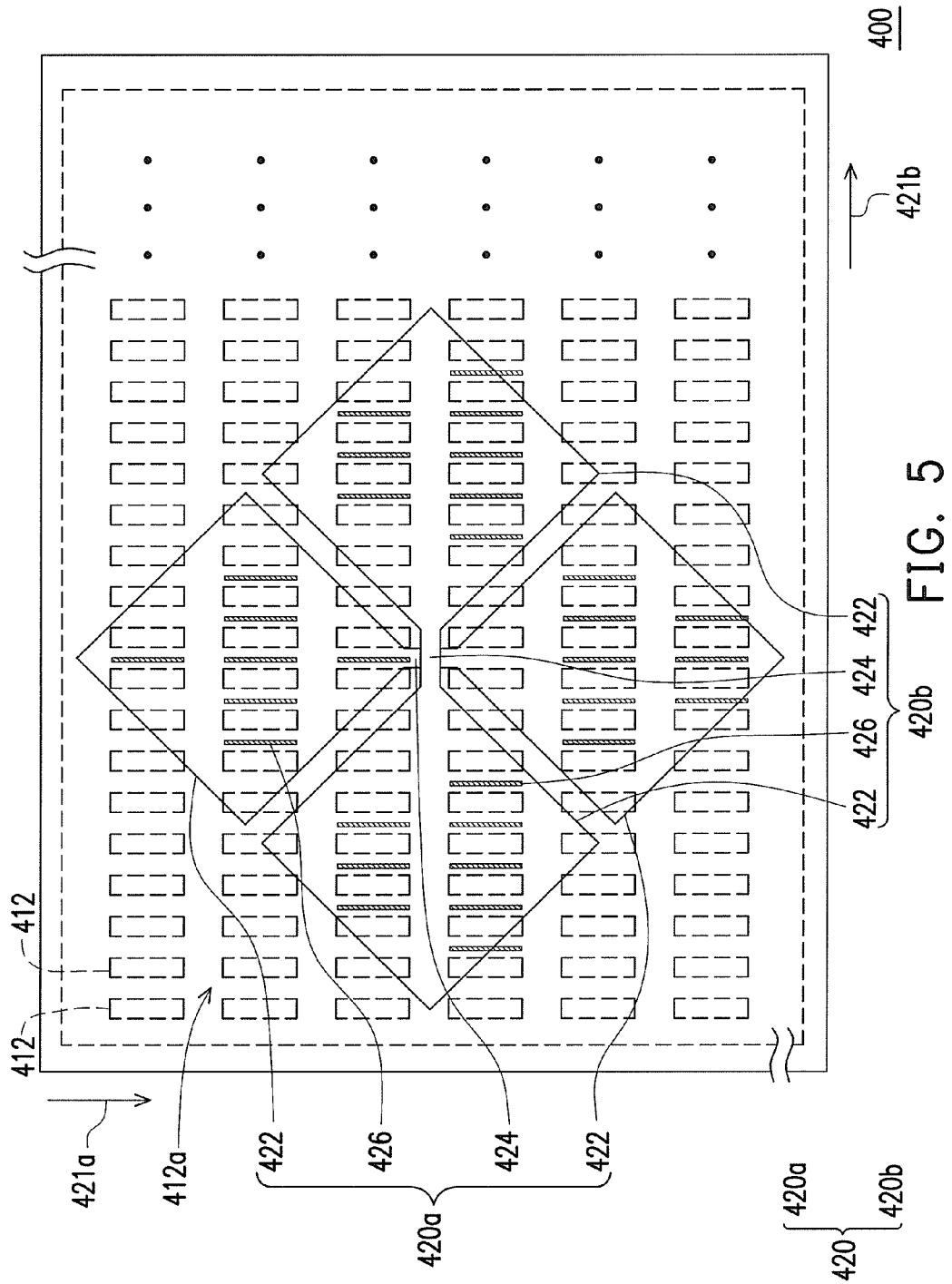
FIG. 5 is a partial top view of a touch-sensing substrate of the present invention.

FIG. 5 is a partial top view of a touch-sensing substrate of the present invention. For simplicity of illustration, FIG. 5 mainly depicts structures of display regions and sensing serials, omitting other possible layers. Referring to FIG. 5, a touch-sensing substrate 400 of the present embodiment includes a substrate 410 and a plurality of sensing serials 420.

In the present embodiment, the material of the substrate 410 is, for example, as that of the above-mentioned substrate 100. Further illustration thereof will not be given again herein. In addition, the substrate 410 has a plurality of display regions 412. A separated region 412a is disposed between the display regions 412. Similarly, if a patterned color filter layer is disposed on the aforesaid display region 412, the color filter substrates 100, 100a, 100b, and 200 as described above may be formed. Certainly, in the present embodiment, the display regions 412 may only be corresponding to the disposition of the patterned color filter layers. That is, on the display regions 412, the patterned color filter layers may be selectively disposed on the transistor array substrate to form a color filter on array substrate. As such, the touch-sensing substrate 400 mainly provides touch-sensing functionality.

In addition, methods of arranging the plurality of sensing serials 420 on the substrate 410 may adopt the design of the above-mentioned color filter substrates 100, 100a, 100b, and 200. In other words, the sensing serial 420 includes a plurality of sensing pads 422, bridging lines 424, and patterned conductive layers 426. The sensing serial 420 includes a first sensing serial 420a arranged along a first direction 421a and a second sensing serial 420b arranged along a second direction 421b. The first direction 421a and the second direction 421b are substantially perpendicular, as shown in FIG. 5.

However, regardless of how the sensing serials 420 and the layers of the display region 412 are arranged and designed, when the layer thickness of the sensing serials 420 is reduced to increase transmittance of the touch-sensing substrate 400, the problem of increased sheet resistance of the sensing serials 420 may also occur. Therefore, adopting the solution illustrated in the above embodiment to dispose the patterned conductive layers 426 above or below the sensing pads 422, resistance of the sensing serials 420 will not be significantly increased resulted from the reduction in thickness of the sensing pads 422. Related description of the principle is as given in the previous embodiment and will not be further illustrated herein.

It should be noted that design of the sensing serials 420 are similar to the above-mentioned sensing serials 130. Thus, the first sensing serial 420a and the second sensing serial 420b are insulated from each other. Similarly, each first sensing serial 420a and each second sensing serial 420b includes the aforesaid sensing pads 422, bridging lines 424, and patterned conductive layers 426.

In each sensing serial 420, each bridging line 424 connects two adjacent sensing pads 422. The patterned conductive layers 426 are stacked with the sensing pads 422 and are electrically connected to the sensing pads 422. The positions of the patterned conductive layers 426 are corresponding to the separated region 412a between the display regions 412. In detail, the arrangement and disposition of the sensing serials 420 shown in FIG. 5 is merely an example, which is not to be limited hereby. The arrangement may also adopt the arrangement methods illustrated in FIG. 1A, FIG. 2A, FIG. 2B, FIG. 3, or a combination thereof.

It should be noted that the area of the above-mentioned color filter substrates 100, 100a, 100b, and 200 or the sensing pads 132 and 422 of the touch-sensing substrate 400 are all greater than the area of the patterned color filter layers 120 or the display regions 412.

In addition, the touch-sensing substrate 400 of the present embodiment may also be adopted on the touch-sensing liquid crystal display 300 for the touch-sensing liquid crystal display 300 to have better display quality and touch-sensing resolution.

In summary, the touch-sensing substrate, the color filter substrate, and the touch-sensing liquid crystal display of the present invention have at least the following advantages. First, the increased sheet resistance due to reduction in thickness of layers is effectively improved when thickness of the sensing serials is decreased to promote transmittance of the color filter substrate and the touch-sensing substrate by disposing a plurality of patterned conductive layers above/below the sensing pads. Furthermore, according to the area ratio and various implementation types of disposing the patterned conductive layers in the separated region, not only are the above-mentioned advantages attainable, but use of black matrix layers may also be reduced to save cost. Moreover, design arrangement of the sensing serials may also enable the color filter substrate or the touch-sensing substrate to have a simpler design of the touch-sensing units and thus may further be used to raise the touch-sensing resolution and sensitivity. As such, the liquid crystal display adopting the above-mentioned color filter substrate and touch-sensing substrate has superior display quality, better touch-sensing resolution or sensitivity, and lowered cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A color filter substrate for a touch-sensing display, comprising:
 a substrate having a first surface and a second surface opposite to the first surface and a plurality of display regions arranged in array, wherein a separated region is located between the display regions;

a plurality of patterned color filter layers arranged in array on the first surface and corresponding to the display regions;

a plurality of sensing serials arranged on the second surface, wherein the sensing serials are insulated from each other and comprising:

a plurality of sensing pads;

a plurality of bridging lines, each bridging line connecting two adjacent sensing pads; and a plurality of patterned conductive layers disposed corresponding to the separated region between the display regions, wherein each of the patterned conductive layers is substantially contacted and electrically connected with one of the sensing pads and is not directly contacted with another one of the sensing pads.

2. The color filter substrate according to claim 1, wherein the sensing serials comprise:

a plurality of first sensing serials extending along a first direction; and a plurality of second sensing serials extending along a second direction, wherein the first direction and the second direction are substantially perpendicular.

3. The color filter substrate according to claim 1, wherein a material of the sensing pads comprises transparent conductive material.

4. The color filter substrate according to claim 1, wherein a material of the bridging lines and a material of the patterned conductive layers are the same.

5. The color filter substrate according to claim 1, wherein a sheet resistance of the bridging lines is lower than a sheet resistance of the sensing pads.

6. The color filter substrate according to claim 1, wherein a sheet resistance of the patterned conductive layers is lower than a sheet resistance of the sensing pads.

7. The color filter substrate according to claim 1, wherein a material of the bridging lines and the patterned conductive layers comprises metal.

8. The color filter substrate according to claim 1, wherein a material of the bridging lines and the patterned conductive layers comprises a multi-layer metal structure composed of titanium, aluminum and titanium.

9. The color filter substrate according to claim 1, wherein the patterned conductive layers are disposed between the substrate and the sensing pads.

10. The color filter substrate according to claim 1, wherein the sensing pads are disposed between the substrate and the patterned conductive layers.

11. The color filter substrate according to claim 1, further comprising a black matrix layer disposed on the first surface and located in the separated region.

12. The color filter substrate according to claim 1, wherein each patterned conductive layer is a strip patterned conductive layer.

13. The color filter substrate according to claim 1, wherein each patterned conductive layer is a mesh patterned conductive layer.

14. The color filter substrate according to claim 1, wherein an area of each sensing pad is greater than an area of each patterned color filter layer.

15. A touch-sensing liquid crystal display, comprising:
a color filter substrate, comprising:

a substrate having a first surface and a second surface opposite to the first surface and a plurality of display regions arranged in array, wherein a separated region is located between the display regions;

a plurality of patterned color filter layers arranged in array on the first surface and corresponding to the display regions;

a plurality of sensing serials arranged on the second surface, wherein the sensing serials are insulated from each other and comprising:

a plurality of sensing pads;

a plurality of bridging lines, each bridging line connecting two adjacent sensing pads; and a plurality of patterned conductive layers disposed corresponding to the separated region between the display regions, wherein each of the patterned conductive layers is substantially contacted and electrically connected with one of the sensing pads and is not directly contacted with another one of the sensing pads;

a transistor array substrate disposed opposite to the first surface of the color filter substrate; and a liquid crystal layer disposed between the color filter substrate and the transistor array substrate.

16. A touch-sensing substrate for a touch-sensing display, comprising:

a substrate having a plurality of display regions arranged in array, wherein a separated region is located between the display regions;

a plurality of sensing serials, arranged on the substrate, wherein the sensing serials are insulated from each other and comprising:

a plurality of sensing pads;

a plurality of bridging lines, each bridging line connecting two adjacent sensing pads; and a plurality of patterned conductive layers disposed corresponding to the separated region between the display regions, wherein each of the patterned conductive layers is substantially contacted and electrically connected with one of the sensing pads and is not directly contacted with another one of the sensing pads.

17. The touch-sensing substrate according to claim 16, the sensing serials comprising:

a plurality of first sensing serials extending along a first direction; and a plurality of second sensing serials extending along a second direction, wherein the first direction and the second direction are substantially perpendicular.

18. The touch-sensing substrate according to claim 16, wherein a material of the sensing pads comprises transparent conductive material.

19. The touch-sensing substrate according to claim 16, wherein a sheet resistance of the patterned conductive layers is lower than a sheet resistance of the sensing pads.

20. The touch-sensing substrate according to claim 16, wherein a material of the patterned conductive layers comprises metal.

21. A touch-sensing display, comprising:
a touch-sensing substrate, comprising:

a substrate having a plurality of display regions arranged in array, wherein a separated region is located between the display regions;

a plurality of sensing serials, arranged on the substrate, wherein the sensing serials are insulated from each other and comprising:

a plurality of sensing pads;

a plurality of bridging lines, each bridging line connecting two adjacent sensing pads; and a plurality of patterned conductive layers disposed corresponding to the separated region between the display regions, wherein each of the patterned conductive layers is substantially contacted and electrically connected with one of the sensing pads and is not directly contacted with another one of the sensing pads;

a transistor array substrate disposed opposite to the touch-sensing substrate; and a display medium disposed between the touch-sensing substrate and the transistor array substrate.

22. The touch-sensing display according to claim 21, the sensing serials comprising:

a plurality of first sensing serials extending along a first direction; and a plurality of second sensing serials extending along a second direction, wherein the first direction and the second direction are substantially perpendicular.

23. The touch-sensing display according to claim 21, wherein a material of the sensing pads comprises transparent conductive material.

24. The touch-sensing display according to claim 21, wherein a sheet resistance of the patterned conductive layers is lower than a sheet resistance of the sensing pads.

25. The touch-sensing display according to claim 21, wherein a material of the patterned conductive layers comprises metal.

26. The touch-sensing display according to claim 21, wherein the display medium comprises a liquid crystal layer.

27. The touch-sensing substrate according to claim 16, wherein the patterned conductive layer is partially contacted with the sensing pad via a plurality of contact portions.

28. The touch-sensing substrate according to claim 16, wherein the patterned conductive layer is fully contacted with the sensing pad.

* * * * *